May 25, 1948.  D. C. ESPLEY ET AL  2,442,123
SYNCHRONISING OF ALTERNATING VOLTAGE SOURCES
Filed March 8, 1946
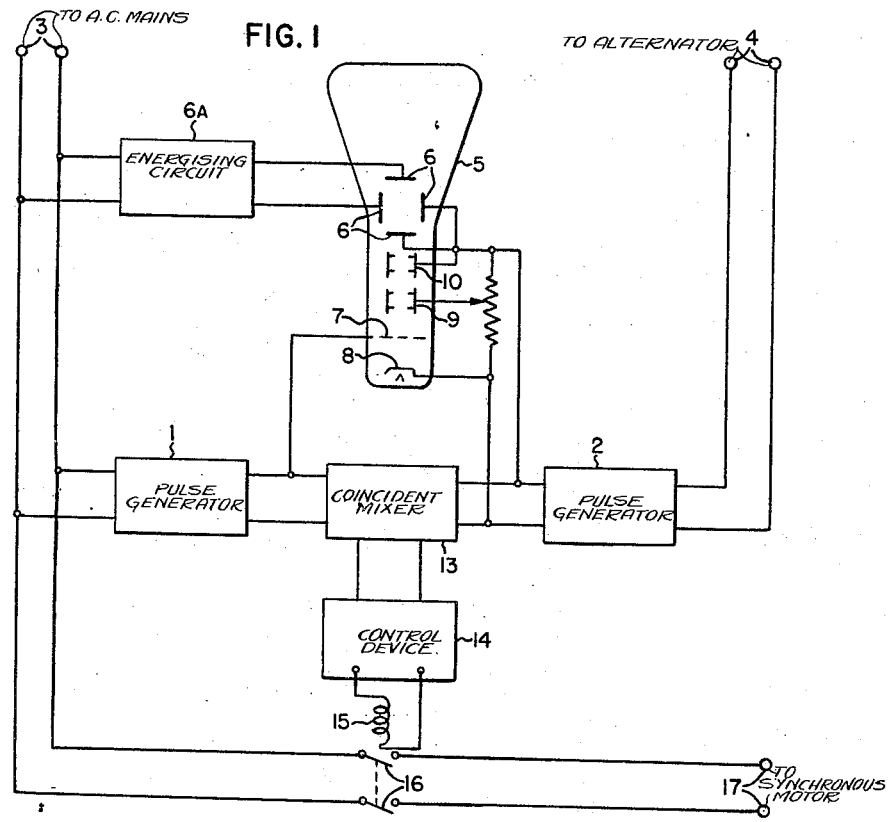
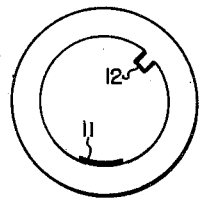
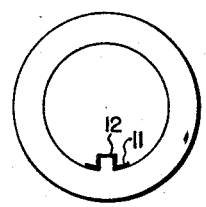
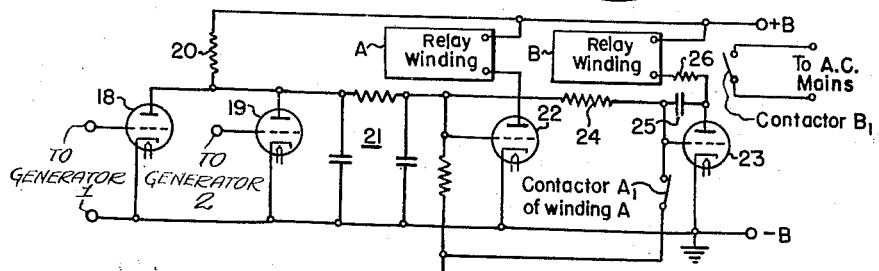
INVENTOR.
DENNIS CLARK ESPLEY,
DEREK OSCAR WALTER,
BY Harry C. Page,
ATTORNEY.

Patented May 25, 1948

2,442,123

UNITED STATES PATENT OFFICE 2,442,123

SYNCHRONISING OF ALTERNATING VOLTAGE SOURCES

Dennis Clark Espley, North Wembley, and Derek Oscar Walter, Wembley, England, assignors to The General Electric Company Limited, London, England Application March 8, 1946, Serial No. 652,928
In Great Britain October 25, 1944

Section 1, Public Law 690, August 8, 1946
Patent expires October 25, 1964

7 Claims. (Cl. 171—118)

This invention relates to the synchronising of alternating voltage sources.

An object of the invention is to provide, in association with two alternating current sources which have the same frequency (or different frequencies in integral multiple relation) and which are required to be electrically connected together, means which serve either to prevent the act of so connecting the sources unless their phase relationship is suitable, and also, if desired, unless the rate of change of their phase difference is less than a predetermined value, or to effect such connection at the instant when their phase relationship becomes suitable, provided, if desired, that the said rate of change is less than a predetermined value. The invention is applicable to cases where the said sources have different frequencies of which one is an integer $n$ times the other only when the ambiguity as to which of $n$ cycles of the higher frequency locks with a cycle of the lower frequency is immaterial.

In accordance with a particular form of the invention, an apparatus for synchronising two alternating voltage sources comprises means for generating two sets of recurrent pulses, individual sets being in constant phase relation to the alternating voltages from individual ones of the aforesaid sources. The apparatus also includes a responsive device responsive to variations in phase relationship of pulses fed thereto and means for feeding the two sets of pulses from the pulse generating means to the responsive device. The apparatus further includes a circuit between one of the voltage sources and utilisation terminals, and a switch device in the above-mentioned circuit operable under control of the responsive device for controlling the closing of the circuit when the sets of pulses are in a predetermined phase relationship.

The object hereinbefore set forth is attained, according to a feature of this invention, by adopting, as the said common controlling device, switching means controlled by said pulse trains or sets in such a manner that the switching means either can be operated only when the pulses of one of said trains are synchronized with the pulses of the other of said trains, or are caused to operate only in consequence of such synchronisation. The said common indicating or controlling device may include a delay device which operates to prevent operation of the said switching means unless the duration of the said synchronisation exceeds a predetermined time interval.

A preferred embodiment of the invention will be described with reference to the accompanying drawing as applied to a combination of direct-coupled synchronous motor, alternator, and exciter, which is adapted to be run up to speed by connecting its exciter to a D. C. source, and to have its motor directly connected to A. C. mains when running at the correct speed and correctly phased. For simplicity of description it will be assumed that the output of the alternator is of the same frequency as the said A. C. mains. (If this were not the case, a small auxiliary alternator could be directly connected to the shaft of the motor-alternator set and be arranged to provide an alternating voltage of suitable frequency.)

In the drawings, Fig. 1 is a block schematic diagram illustrating a controlling device according to the invention and an indicating device associated therewith. Figs. 2a and 2b show forms of indication which may be given on the screen of the indicating device in Fig. 1, and Fig. 3 is a circuit diagram of a part of the controlling device of Fig. 1.

Referring to Fig. 1, two pulse-generators 1 and 2 are arranged to be fed respectively by the said A. C. mains applied at terminals 3 and by the alternator (or auxiliary alternator as the case may be) applied at terminals 4, and to generate trains of pulses having pulse lengths of the order of 10 electrical degrees.

A cathode-ray tube 5 has its deflecting means 6, in this case shown as electrostatic deflecting plates, energised by an energising circuit 6A associated with the A. C. mains and adapted to deflect the beam in known manner along a circular time trace in synchronism with the A. C. mains. The pulse train derived from the A. C. mains and generated by the generator 1 is employed to modulate the cathode ray in such a manner that a fixed arc of the trace, disposed for example at the 6 o'clock position, is substantially brighter than the rest of the trace. For this purpose the pulses are applied in a positive sense between the control grid 7 and cathode 8 of the tube 5. The pulse train from generator 2 derived from the alternator (or auxiliary alternator) is employed to change the radius of the trace over a small arc. This effect is conveniently secured by causing the pulses to vary periodically the potential difference between the cathode 8 on the one hand and on the other hand the accelerating electrodes 9 and 10, and the deflecting plates 6, and thereby to vary the velocity of the beam.

It is arranged, by suitably phasing the A. C. connections, either electrically or mechanically, that, when the motor-alternator set is synchronised with the A. C. mains, the pulse trains will be in phase with each other and the arc of changed radius will coincide with the arc of increased brilliance. In Fig. 2a is shown the appearance of the screen of the cathode ray tube 5 when the pulse trains are not in phase with one another and in Fig. 2b the appearance when the pulse trains are in phase with one another. At 11 is shown the arc of increased brightness produced by the pulses from 1 and at 12 the arc of decreased radius produced by the pulses from 2. When the frequencies of the A. C. mains and of the alternator differ, the arc 12 will run round the trace at a speed of revolution equal to the difference frequency, its direction of revolution indicating whether the set is running fast or slow. When these frequencies are the same but their phases are not synchronised, the arc of changed radius will rest as shown in Fig. 2a in a position displaced from 6 o'clock by an angle denoting the magnitude and sense of the phase difference.

If desired, the pulse train derived from the generator 1 and hence from the mains may be caused to deflect the beam and thereby produce the "keyway" pattern in the circular time trace, while the pulse train derived from the generator 2 and from the alternator is employed to modulate the intensity of the beam.

As shown in Fig. 1, pulses from generators 1 and 2 may also be applied to a responsive device represented as two units effectively comprising a coincident mixer 13 and a control device 14 which, when the pulses in the two trains are coincident, generate current in a relay winding 15 and actuate the relay to close its contacts 16 and thus connect the A. C. mains to terminals 17 and thence to the synchronous motor.

A circuit performing the functions of the units 13 and 14 is shown in Fig. 3. The two pulse trains from generators 1 and 2 are applied respectively in negative sense to the grids of two thermionic valves 18 and 19 which are normally biased to pass a substantial current through a common anode load resistance 20. The potential drop developed across this resistance is applied, through a smoothing network 21 which removes the A. C. component of pulse train frequency, as a negative bias on the grid of a third valve 22. Each of the first two valves 18 and 19 is normally capable of maintaining its anode potential at such a low value as to maintain the potential on the grid of the valve 22 below the cut-off point. However, when pulses are applied simultaneously to the grids of the two valves 18 and 19, the resulting decrease in current through their common anode resistance 20 causes the potential on the grid of the valve 22 to rise to such a value that current flows in its anode circuit.

A relay winding A may be energised by the anode current of the valve 22 and arranged to close the main motor contactor when this anode current attains a predetermined value. However, this arrangement may not prevent the main contactor from closing when the motor and the mains are instantaneously in phase, although there is still an excessive error in frequency synchronism. Accordingly a fourth valve 23 is preferably provided as shown, having in its anode circuit a relay winding B controlling the main contactor B1, which is required to close only when the positive voltage is applied to the grid of the valve 22 for longer than a predetermined time. The valve 23 is accordingly shown associated with a Miller feed-back arrangement, consisting of a resistance 24 connected between the grid of the valve 22 and the grid of the valve 23, a condenser 25 between the grid and the anode of the valve 23, and a resistance 26 in series with the exciting coil of the relay B. The relay A, when operated, removes a standing negative bias from the grid of the valve 23, and serves, when the signal is removed from the grid of the valve 22, to restore this bias and thus immediately return the integration circuit to its zero time condition. The integration circuit is thus prevented from responding to an intermittent signal, and consequently, if the frequencies of the A. C. mains and the motor differ too widely at a time when the mains and the motor are instantaneously in phase, the delay circuit will prevent operation of the main contactor during such time, and the timing cycle will start afresh at the next momentary phase synchronisation of the pulse trains.

The response of the valve 22 may be subject to a relatively short delay, e. g. by associating it with a Miller feedback arrangement. This may be desirable, for example, in order to prevent chattering of the contacts of the relay in its anode circuit when the speed of the motor is fluctuating rapidly about a substantially correct mean value and causing the pulse trains to come successively into and out of overlapping relationship.

The circuits are so arranged that, should the power supply or should any of the valves fail, the relay B will drop out, or will remain in the open condition, and thus prohibit operation of the main contactor.

Means may be provided for automatically interrupting the supply to the valves immediately after completion of the synchronising operation. The apparatus is therefore available for carrying out any other desired synchronising operation.

In a fully automatic system frequency-selective networks may be provided in the paths between the generators 1 and 2 of Fig. 1 and the two valves 18 and 19 of Fig. 3 in order to prevent the apparatus from responding at multiple or sub-multiple speeds.

We claim:

1. Apparatus for use in synchronising two alternating voltage sources, said apparatus comprising means for generating two sets of recurrent pulses, individual sets being in constant phase relation to the alternating voltages from individual ones of said sources, a responsive device responsive to variations in phase relationship of pulses fed thereto, means for feeding the said two sets of pulses from said pulse generating means to said responsive device, a circuit between one of said voltage sources and utilisation terminals, and a switch device operated by said responsive device for closing said circuit when said sets of pulses are in predetermined phase relationship.

2. Apparatus according to claim 1, wherein said responsive device is operative to close said circuit when said sets of pulses are substantially coincident.

3. Apparatus for use in synchronising two alternating voltage sources, said apparatus comprising means for generating two sets of recurrent pulses, individual sets being in constant phase relation to the alternating voltages from individual ones of said sources, a responsive device including two electron discharge paths each having an anode and a control electrode, an impedance element connected to pass current from both said discharge paths, means for applying said sets of pulses in negative sense respectively to said control electrodes, and amplitude selective means responsive to an increase in voltage across said impedance element above a predetermined value.

4. Apparatus for use in synchronising two alternating voltage sources, said apparatus comprising means for generating two sets of recurrent pulses, individual sets being in constant phase relation to the alternating voltages from individual ones of said sources, an electron discharge device having a control electrode, means for normally biasing said control electrode substantially to cut off the discharge current flow in said device, a relay traversed by said discharge current, a circuit between one of said voltage sources and utilisation terminals, switch contacts for closing said circuit upon actuation of said relay by flow of discharge current therein, and means for applying to said control electrode an actuating voltage dependent upon the sum of said sets of pulses, this voltage being capable of overcoming said bias and permitting flow of said discharge current when said sets of pulses are substantially coincident.

5. Apparatus according to claim 4, wherein said switch is associated with a delay circuit which prevents the closure thereof unless said actuating voltage is maintained for a predetermined time.

6. Apparatus for use in synchronising two alternating voltage sources, said apparatus comprising means for generating two sets of recurrent pulses, individual sets being in constant phase relation to the alternating voltages from individual ones of said sources, a responsive device responsive to variations in phase relationship of pulses fed thereto, means for feeding said two sets of pulses from said pulse generating means to said responsive device, a circuit between one of said voltage sources and utilisation terminals, and a switch device in said circuit and operable under control of said responsive device for controlling the closing of said circuit when said sets of pulses are in predetermined phase relationship as determined by said responsive device.

7. Apparatus for use in synchronising two alternating voltage sources, said apparatus comprising means for generating two sets of recurrent pulses, individual sets being in constant phase relation to the alternating voltages from individual ones of said sources, a responsive device responsive to variations in phase relationship of pulses fed thereto, means for feeding said two sets of pulses from said pulse generating means to said responsive device, a circuit between one of said voltage sources and utilisation terminals, and a switch device in said circuit and operable under control of said responsive device for controlling the closing of said circuit when said sets of pulses are in predetermined phase relationship as determined by said responsive device and when the rate of change of phase difference of said sets of pulses is less than a predetermined value.

DENNIS CLARK ESPLEY.
DEREK OSCAR WALTER.

REFERENCES CITED

The following references are of record in the file of this patent:

UNITED STATES PATENTS

| Number | Name | Date |
|---|---|---|
| 2,018,268 | Knowles | Oct. 22, 1935 |
| 2,036,983 | Ryan | Apr. 7, 1936 |
| 2,044,618 | Livingston | June 16, 1936 |
| 2,166,785 | Aigner | July 18, 1939 |
| 2,367,925 | Brown | Jan. 23, 1945 |
| 2,374,817 | Hardy | May 1, 1945 |